May 14, 1963
R. H. NOVIC
3,090,017
SMOOTHING FILTER HAVING SHUNT CAPACITOR CHANGED
VIA DIODE FROM OUTPUT AND DISCHARGED
VIA SECOND DIODE INTO INPUT
Filed Dec. 11, 1957
2 Sheets-Sheet 1
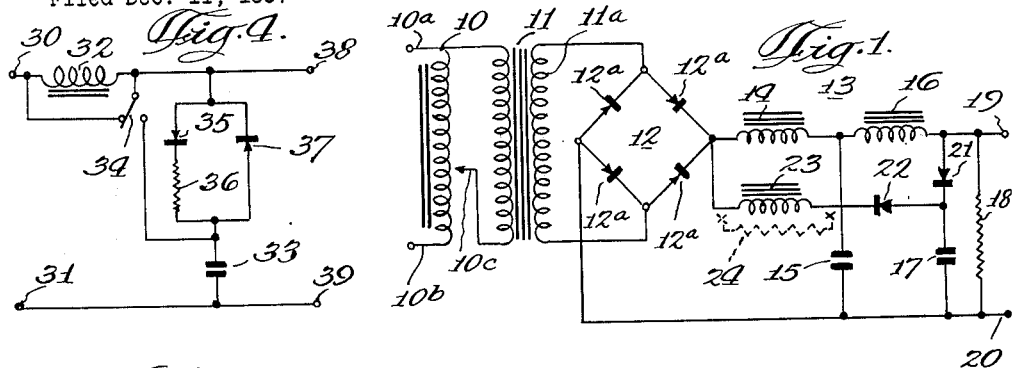
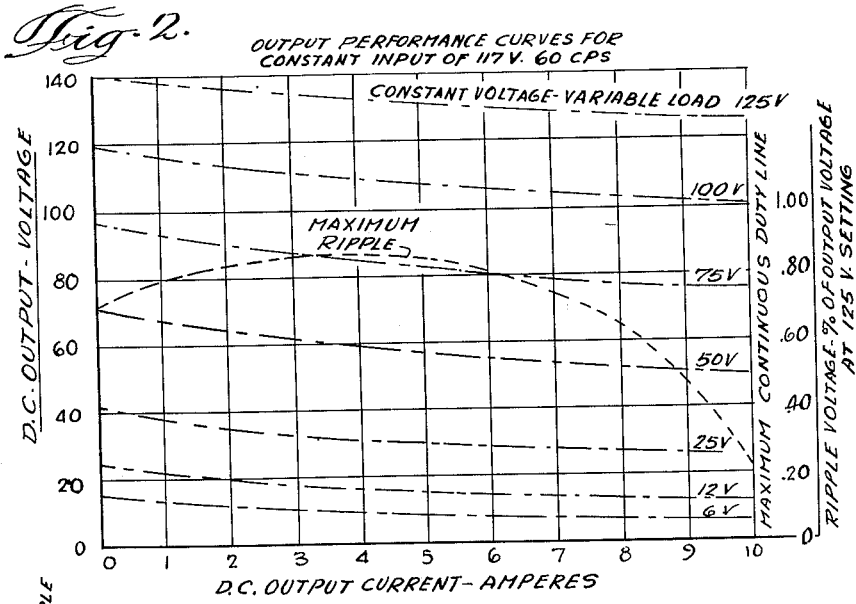
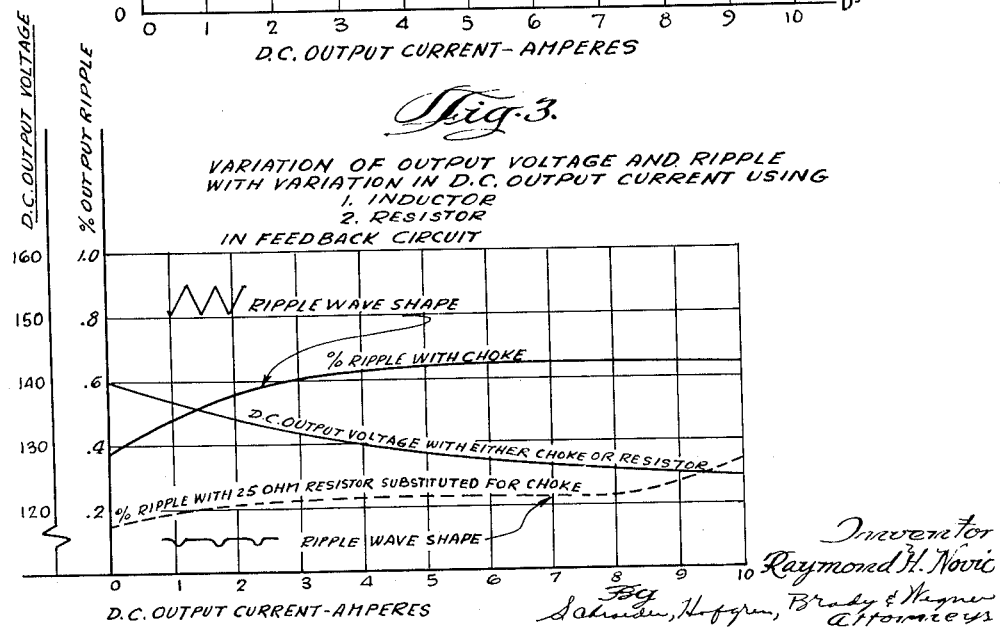
Inventor
Raymond H. Novic
By
Salinger, Hofgren, Brady & Wagner
Attorneys Inventor
Raymond H. Novic United States Patent Office 3,090,017
Patented May 14, 1963

3,090,017
SMOOTHING FILTER HAVING SHUNT CAPACITOR CHARGED VIA DIODE FROM OUTPUT AND DISCHARGED VIA SECOND DIODE INTO INPUT
Raymond H. Nevic, Chicago, Ill., assignor to Electro Products Laboratories, Inc., a corporation of Illinois
Filed Dec. 11, 1957, Ser. No. 702,155
1 Claim. (Cl. 333—79)

This invention relates to a direct current power supply and more particularly to a filter network therefor, with a novel regulating circuit.

Power supplies which convert alternating current power to direct current power normally include a rectifier and a filtering network which is made up of one or more series elements of resistance or inductance and one or more shunt elements of capacity. In an unregulated power supply, the terminal voltage of the power supply drops, often to an excessive degree, as the current drain on the power supply increases, due to the internal impedance of the power supply itself. This invention is concerned with a novel regulating circuit for a power supply filter network which compensates for or prevents this voltage drop.

It is a general object of this invention to provide a novel and improved filter network with charge and discharge circuits for the energy storage element of the filter which are, at least in part, separate and isolated from each other.

One feature of the invention is that the filter includes an energy storage element, a circuit for charging the element, a circuit for discharging the element and a circuit element having an asymmetrical flow characteristic in one of the circuits. Another feature is that the charge and discharge circuits have different impedances. A further feature is that both the charge and discharge circuits include a circuit element having a unidirectional flow characteristic.

Still another feature is that the discharge circuit for the energy storage element has an impedance higher than the charge circuit. Yet a further feature is that the discharge circuit includes a portion of the charge circuit.

Another feature is the provision of a power supply including a source of alternating current, a rectifier, a series filtering element, a shunt energy storage element with the series filtering element in the charge circuit thereof, an element having a unidirectional flow characteristic in the charge circuit, and a discharge circuit including an element having a unidirectional flow characteristic connected in series with an impedance element between the energy storage element and the series filtering element.

Still a further feature is the provision of a surge current power supply filter network having parallel charge and discharge circuits for the energy storage element, and of different impedances with a circuit element having an asymmetrical flow characteristic in one of the circuits. And another feature is that the charge circuit has an impedance higher than the discharge circuit and there is a circuit element with a unidirectional flow characteristic in the discharge circuit, so that the power supply will deliver a heavy current for a short period of time without dropping the terminal voltage of the power supply and will recharge the energy storage element without overloading the rectifier.

Further features and advantages of the invention will readily be apparent from the following specification and from the drawings, in which:

FIGURE 1 is a schematic diagram of an embodiment of the invention;

FIGURE 2 is a chart showing performance curves of the circuit of FIGURE 1;

FIGURE 3 is a chart showing physical performance curves of the circuit of FIGURE 1;

FIGURE 4 is a schematic diagram of a modified filter network;

Figure 5:
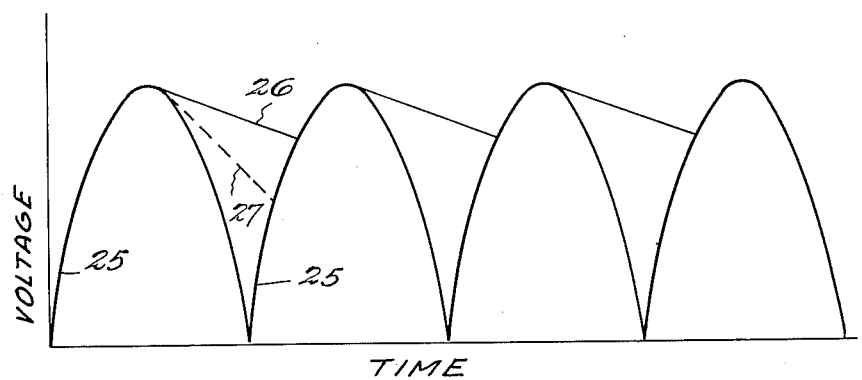
FIGURE 5 is a curve illustrating the performance of FIGURE 1.

Direct current rectifier-type power supplies, as distinguished from motor generator sets and the like are used widely for operating electronic equipment, and in the testing of electronic equipment and small direct current motors, as in a repair shop. In order to achieve proper operation of the equipment from the power source, the output terminal voltage from the power supply must be relatively stable regardless of the size of the load connected thereto, within the operating range of the load; and the alternating current ripple superimposed upon the direct current voltage must not be excessive.

Turning now to FIGURE 1 of the drawings, a power supply is shown including a variable auto transformer 10 having terminals 10a and 10b which are connected to a suitable source of power, as 117 volts A.C. (not shown). The movable tap 10c of auto transformer 10 may be adjusted by the user of the power supply to control the input voltage to the power supply, and thus the output voltage derived therefrom. The output of variable autotransformer 10 is coupled through isolation transformer 11, which may provide a slight step-up in voltage, to a rectifier indicated generally as 12, connected to the terminals of secondary winding 11a of transformer 11. The rectifier 12, as shown in the drawings, is a full-wave bridge rectifier circuit utilizing four unidirectional flow elements 12a, as germanium rectifier elements.

The power supply filter 13 is an inductor input network including inductor 14 connected to one of the output terminals of rectifier 12, shunt capacitor 15 connected between inductor 14 and the other output terminal of the rectifier, a second series inductor 16 and a second shunt capacitor 17. A bleeder resistor 18 is connected across the filter network output terminals 19 and 20 to which the load (not shown) is connected.

In accordance with the present invention, the charge circuit for energy storage element or capacitor 17, which includes inductors 14 and 16, is completed through an element having a unidirectional flow characteristic, as selenium rectifier element 21, connected between the output terminal of inductor 16 and capacitor 17. The discharge circuit for capacitor 17 also includes an element having a unidirectional flow characteristic, as selenium rectifier 22, connected to the junction between rectifier 21 and capacitor 17 and through a third inductor 23 to the input terminal of inductor 14, whereby the discharge current from capacitor 17 flows from the capacitor 17 through rectifier element 22, inductor 23, and inductors 14 and 16. The load current is made up of two components, one flowing directly from rectifier 12 through inductors 14 and 16 to the load, and the other flowing from capacitor 17 through inductors 23, 14 and 16, during those portions of the cycle when the output voltage of the rectifier drops below the potential across the charged capacitor. Rectifier elements 21 and 22 act in the manner of flood gates directing the charge and discharge currents through the proper paths.

The operation of the circuit may be visualized by considering the instantaneous voltage across capacitor 17, illustrated in the curves of FIGURE 5. It is to be understood that these curves are qualitative and idealized, and do not purport to represent the quanitative conditions in the circuit, as certain side effects of the load and filter are not taken into consideration. Neglecting the filtering effect of inductors 14 and 16 and capacitor 15, a series of half wave pulses from the full wave rectifier are impressed across the capacitor. The capacitor charges up to its maximum voltage on the peaks of the half wave pulses 25. During the period between pulse peaks, power is supplied to the load from the charge stored on the capacitor, which of course drops the voltage across it. This drop in voltage is indicated by the lines 26 of the curves. As a comparison, a broken line 27 indicates the nature of the drop in voltage across the output capacitor of a filter, with a similar load, but which does not incorporate the novel circuit of FIGURE 1. The lesser slope of the capacitor discharge curve 26 of the circuit of FIGURE 1 results from the increased impedance in the discharge circuit, which increases the time constant in the circuit. This in turn improves the regulation of the power supply and reduces the ripple voltage.

It has been found that a power supply incorporating the isolated charge and discharge circuits of different impedance as illustrated in FIGURE 1 not only has an improved voltage regulation characteristic, but the output has an improved ripple voltage content, particularly at higher load currents. A power supply including a filter network having only inductors 14 and 16 and capacitors 15 and 17 was modified by the addition of rectifier 21 in the charge circuit of capacitor 17 and rectifier 22 and inductor 23 in the feedback portion of the discharge circuit for the capacitor. The voltage regulation of the power supply, which may be defined as the difference between the "no load" and "full load" terminal voltage, divided by the no load voltage, was improved from 20% in the original circuit to 10% in the circuit shown in FIGURE 1, an improvement of 50%. In addition, as pointed out above, the amplitude of the ripple voltage at high load currents was reduced. In this power supply, inductor 14 is forty-five turns of #10 wire on a one and one-half inch EI core two and one quarter inches thick; and inductor 16 is substantially identical. Inductor 23 comprises forty-five turns of #10 wire on a one and one-half inch EI core, two inches thick. Capacitor 15 is 3,000 $\mu f$. (microfarads) while capacitor 17 is 2,000 $\mu f$. Bleeder resistor 18 is 100 ohms, with a 200 watt rating. It is to be understood that these values are intended only as illustrative of a specific embodiment of the invention, and many changes will be obvious to those skilled in the art.

Performance curves for the power supply described above are given in FIGURE 2 where a family of terminal voltage curves as a function of load current are plotted for various settings of auto transformer 10, each curve being designated by the "full load" terminal voltage. These curves are obtained by adjusting the auto transformer for the desired load voltage for the full load current of 10 amperes and then decreasing the load current to zero while noting the increase in terminal voltage as the current is reduced. It will be noted from an examination of the family of curves that the regulation from about 3.5 amperes load current to full load current is exceptionally good and that even when the load current is reduced to zero, the terminal voltage does not rise excessively. The broken curve designated "Maximum Ripple" indicates the maximum ripple which will be obtained in the output of the filter, as a function of output current, based on the normal production variations in the values of the filter components, and assuming that all of them vary from their nominal value in such a manner that the ripple voltage is increased. In practice, this situation is rarely, if ever, encountered, and actual ripple voltage in a given unit will generally be much less than indicated by this curve.

The curves of FIGURE 3 permit a comparison of the discharge feedback circuit of FIGURE 1, utilizing inductor 23, with the same circuit having a resistor, indicated at 24, substituted for the inductor. The curves were plotted for a 25 ohm resistor. The D.C. output voltage regulation curve is identical for both the inductor 23 and the resistor 24. The ripple voltage, however, is, with the resistor in the feedback circuit, only about one-half the ripple voltage occurring when the inductor is used. Furthermore, the wave shape of a ripple with the resistor in the circuit is a series of small pulses, as indicated in FIGURE 3, as compared with a substantially saw-tooth wave with the inductor. If only the ripple characteristics are considered, it seems that a resistor is more desirable in the feedback circuit than an inductor. However, the use of the resistor in this circuit lowers the efficiency of the overall power supply system so that a much higher input power is required for a given output power. Accordingly, in most cases, the inductor feedback circuit is preferable.

Turning now to FIGURE 4 of the drawings, a modified form of the invention is illustrated in a filter circuit for a power supply operating with a special load, supplying an extremely high surge current without a great drop in terminal voltage, and without overloading the rectifier of the power supply (not shown). The terminals 30 and 31 are connected to the output terminals of the rectifier, as the full wave bridge type rectifier shown in FIGURE 1, and the filter includes a series inductor element 32 and a shunt capacitor 33. With the switch 34 in the position shown in the drawing, shorting the inductor 32, capacitor 33 is charged through a circuit including rectifier element 35 and resistor 36, 100 ohms. The discharge path for capacitor 33 is through rectifier element 37, connected in parallel with element 35 and resistor 36, permitting flow of current in the opposite direction. The load (not shown) is connected to output terminals 38 and 39. The charge circuit for the capacitor, which is completed through the resistor 36, permits charging from the rectifier, at a sufficiently slow rate to prevent overloading the rectifier elements therein. During discharge, there is negligible impedance in the circuit through unidirectional flow element 37 and the charge on capacitor 33 is released at a rate determined solely by the impedance of the load. With the switch 34 in opposite position, the charge and discharge network for capacitor 33, made up of elements 35, 36 and 37 is shorted out and the filter network is of a usual LC configuration.

An example of a load which requires a filter network of the type shown in FIGURE 4 is found in the bench servicing of certain models of automobile radios which incorporate solenoids that require an initial surge current as high as 16–18 amperes at 12 volts, direct current, for energization. Once the solenoid has been actuated the current requirement drops to less than one ampere. With a straight LC filter network, the current available is adequate to actuate such a solenoid, but the heavy current drain on the power supply drops the terminal voltage below 12 volts. As a result, a solenoid draws a fairly heavy current, but is not actuated. If the current is allowed to flow with the isolated charge and discharge circuits of FIGURE 4, the heavy surge current required by such a load is readily supplied by capacitor 33, without affecting the terminal voltage of the filter. If the charge stored by capacitor 33 is insufficient to supply the current necessary to actuate the solenoid, additional current is available from the rectifiers themselves and is delivered directly to the load, inductor 32 is shorted. After the solenoid is energized, capacitor 33 is recharged through rectifier 35, resistor 36 limiting the current, preventing an overload on the rectifier. With the circuit described, the discharge time for the condenser is of the order of 0.1 second while the recharge time is about 0.4 second.

Figure 6:
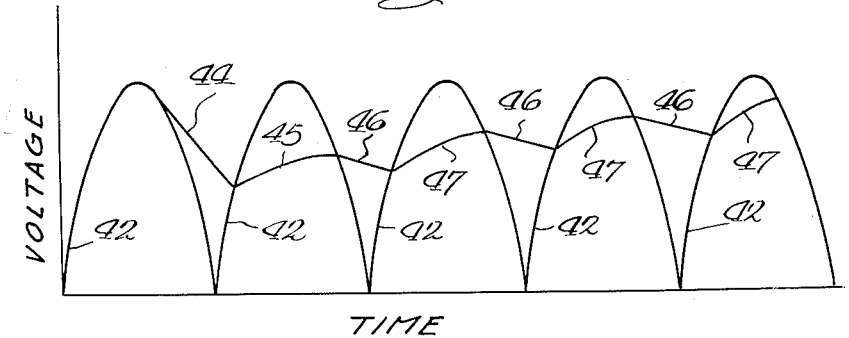
FIGURE 6 is a curve illustrating the performance of FIGURE 4.

FIGURE 6 illustrates the operation of the circuit of FIGURE 4 in terms of the voltage across capacitor 33. Assuming that the heavy load was thrown on the circuit at about the peak of the first half wave pulse 42, as shown, the heavy current drain on the power supply drops the voltage as indicated by line 44. Again assuming that the heavy drain on the power supply ends at the time where line 44 intersects the next half wave pulse 42, capacitor 33 begins to regain its charge along exponential curve 45, determined by time constant of the charge circuit including capacitor 33 and resistor 36. Between the pulses, the charge on the voltage across the capacitor drops slightly as indicated by lines 46, the slope of which is determined by the size of the load. During the peaks of succeeding half wave pulses, the charge across capacitor 33 is continually increased along curves 47, similar in shape to curve 45, but each at a succeedingly higher voltage. This continues until the maximum charge once again appears across the capacitor.

While I have shown and described certain embodiments of my invention, it is to be understood that it is capable of many modifications. Changes therefore, in the construction and arrangement may be made without departing from the spirit and scope of the invention as disclosed in the appended claim.

I claim:

A filter network for a power supply having a rectifier with a pair of output terminals, comprising: a low pass filter having input terminals connected with the output terminals of said rectifier and including a series impedance element and a shunt capacitor, said low pass filter having a pair of output terminals to which a load may be connected; an output capacitor for said filter; a charge circuit for said output capacitor including a diode connected in series with the capacitor across the output terminals of said filter said diode polarized in a direction charging said capacitor from said rectifier; and a discharge circuit for said output capacitor including a diode connected in series with an impedance element from said capacitor to an input terminal of said filter said diode being polarized in a direction discharging said capacitor.

References Cited in the file of this patent

UNITED STATES PATENTS

| | | |
|---|---|---|
| 2,296,745 | Smith | Sept. 22, 1942 |
| 2,308,013 | Lee | Jan. 12, 1943 |
| 2,428,390 | Smith | Oct. 7, 1947 |
| 2,436,794 | Dawson | Mar. 2, 1948 |
| 2,445,800 | Mortlock | July 27, 1948 |
| 2,467,744 | Harris | Apr. 19, 1949 |
| 2,567,928 | Farmer | Sept. 18, 1951 |
| 2,751,548 | Gunderson | June 19, 1956 |
| 2,815,456 | Ormond | Dec. 3, 1957 |
| 2,912,651 | Leeds | Nov. 11, 1959 |